Figure 1:
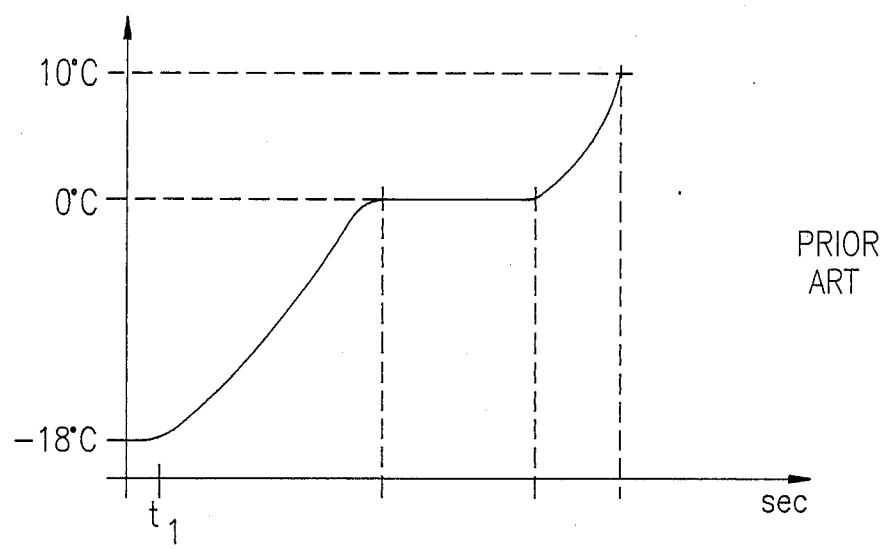

United States Patent [19]

Meyer

[11] Patent Number: 4,932,217
[45] Date of Patent: Jun. 12, 1990

[54] PROCESS FOR CONTROLLING A HEATER, IN PARTICULAR A DEFROST HEATER FOR REFRIGERATING PLANTS

[76] Inventor: Friedhelm Meyer, Hof Geisenberg, D-5920 Bad Berleburg 11, Fed. Rep. of Germany

[21] Appl. No.: 309,827

[22] Filed: Feb. 10, 1989

[30] Foreign Application Priority Data

Feb. 11, 1988 [DE] Fed. Rep. of Germany ....... 3804267

[51] Int. Cl.$^5$ .................................................. F25D 21/08
[52] U.S. Cl. ........................................ 62/156; 62/155; 219/492
[58] Field of Search ..................... 62/156, 155, 234; 236/46 R, 46 F; 165/12, 32, 39; 219/492, 497; 340/588, 589

[56] References Cited

U.S. PATENT DOCUMENTS

| | | | |
|---|---|---|---|
| 4,432,211 | 2/1984 | Oishi et al. | 62/155 |
| 4,689,965 | 9/1987 | Janke et al. | 62/156 X |
| 4,803,344 | 2/1989 | Wolf et al. | 219/497 |
| 4,812,625 | 3/1989 | Ceste, Sr. | 219/497 |

*Primary Examiner*—Harry B. Tanner
*Attorney, Agent, or Firm*—Austin R. Miller

[57] ABSTRACT

In the case of a process for controlling a heater, in particular a defrost heater for a refrigerating plant which has a temperature sensor, which is connected to a system for cutting in and cutting out the heater, during the operation of the heater, the temperature of the room to be heated is measured at certain intervals of time, a measured temperature value being stored in each case and compared with the following measured value, whereupon the heater is cut out whenever the following measured value indicates a temperature which is higher by a certain amount than the preceding stored measured value, and the heater is cut in or remains cut in whenever the following measured value indicates a temperature which is lower by a certain amount than the preceding stored measured value.

3 Claims, 1 Drawing Sheet

PROCESS FOR CONTROLLING A HEATER, IN PARTICULAR A DEFROST HEATER FOR REFRIGERATING PLANTS

The invention relates to a process for controlling a heater.

In cooling or refrigerating plants, a defrosting clock is provided which cuts in the defrost heater at fixed intervals of time for the defrosting of frost or ice forming on the evaporator. It is also possible to provide in the region of the evaporator an ice detector, which cuts in the defrost heater if ice forms. In this case, the defrost heater is usually operated continuously, so that the defrost heater remains switched on the whole time from the beginning of defrosting to the end of defrosting at a fixed temperature value of, for example, 10 or 20° C. As a result, the evaporator, and consequently the refrigerating room, is supplied with more heat than is required for defrosting. For instance, with a usual defrost heater, a temperature of 300° C. may be reached at the heating elements after only 10 minutes. As a result, steam is released, which is deposited everywhere, damages or destroys insulations and is precipitated even on the refrigerating goods themselves, which may impair them. If the steam is deposited on the fan wheel, its running is impaired once the steam has frozen. Due to the high supply of energy or heat by the defrost heater, the temperature in the refrigerator room rises above the cut-out temperature. It takes a considerable time after defrosting to lower the excessively raised temperature in the refrigerating room back to refrigerating level. In addition, in spite of the high supply of heat with continuously cut-in defrost heater, ice pockets form on the evaporator, leading to malfunctioning of the evaporator after a certain time in operation.

The invention is based on reducing the use of energy in heating up the room, in particular when defrosting in refrigerating plants.

This object is achieved by measuring the room temperature at certain intervals of time and comparing the measured value with the preceding measured value, determining whether the room temperature has increased or not, whereupon, in the case of an increase in room temperature, the heater is cut out and the time lag in the response of the heater, which in the case of known heating systems leads to an excessive supply of heat, is utilised for the further increasing of the room temperature. If a drop of the room temperature is determined, the heater is cut in again or remains cut in. By monitoring the room temperature at intervals, the supply of heat is restricted to the minimum necessary for the defrosting operation in a refrigerating plant. Accordingly, the disadvantages described, such as the release of steam, excessively high temperature after the defrosting operation and the formation of ice pockets on the evaporator are also eliminated to a great extent.

Advantageous developments of the invention are specified in the following description and in the claims.

Figure 2:
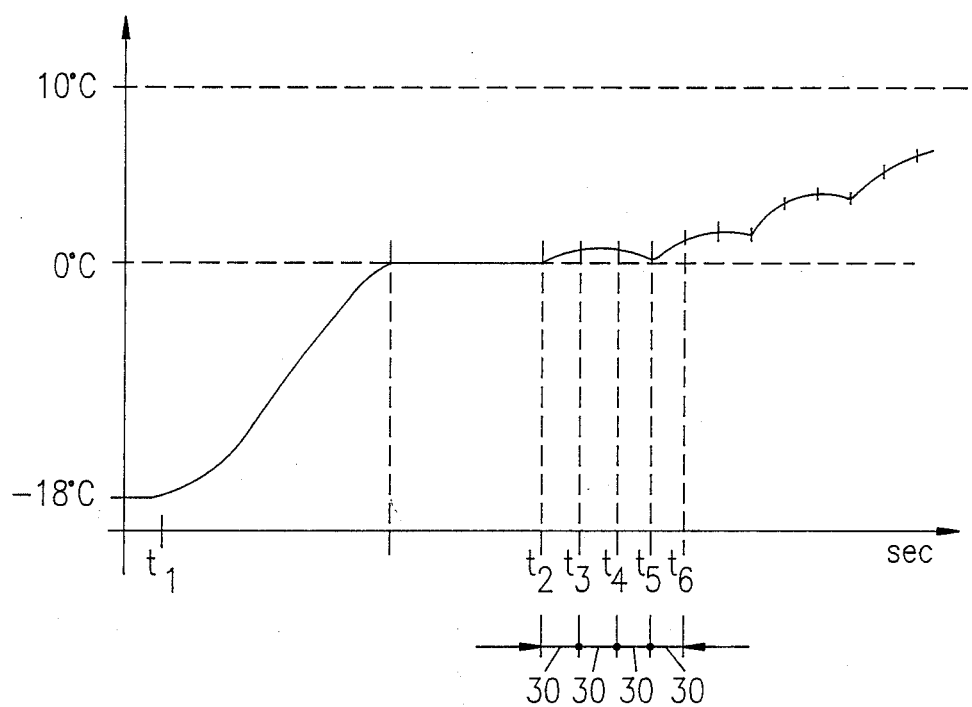

The invention is explained in more detail by way of example with reference to the drawing, in which:

FIG. 1 shows a temperature profile of a room to be heated up with continuous operation of the defrost heater according to a prior art and FIG. 2 shows the temperature profile in the room to be heated up with operation of a defrost heater system according to the invention.

In the figures, the time is given in seconds on the abscissa and the temperature is given in ° C. on the ordinate, the curve given reproducing the temperature profile in the room to be heated up, established for example by means of a temperature sensor. In the case of a refrigerating plant, the temperature sensor is in the region of the evaporator, on which frost and ice which have formed during refrigerating operation are to be removed by the defrost heater. The temperature sensor itself may be of any design. An ice detector, which emits a signal for cutting in the defrost heater if frost or ice occurs, may also be provided on the evaporator.

If the command to defrost comes from such an ice detector or a defrosting clock, the defrost heater is cut in, for example at a temperature of $-18°$ C. According to the prior art, the defrost heater cut in at the time $t_1$ remains cut in the whole time, as shown by FIG. 1. First of all the temperature in the evaporator passes through a sensible range from the beginning of defrosting to approximately $0°$ C., whereupon a latent range follows, in which the transformation of the solid ice crystals into water takes place. At the end of the latent range at $0°$ C., the temperature quickly rises due to the defrost heater being cut in the whole time, so that the end of defrosting at $10°$ C. is reached in a relatively short time. In this period, again referred to as a sensible range, steam is formed by reason of the excessive supply of heat and ice pockets form in the evaporator, because not all areas of the evaporator are covered by the rapid heating-up, although overall the cut-out temperature of, for example, $10°$ C., depending on the arrangement of the temperature sensor, is reached. Once the defrost heater has cut out, the temperature in the evaporator nevertheless increases beyond the cut-out temperature due to the time lag in the response of the heater.

In the case of operating the defrost heater according to the invention, as exemplified in FIG. 2, the defrost heater remains cut in during the time from the cut-in time $t_1$ until reaching the latent change around $0°$ C. and during the latent range. During or at the end of the latent range, at the time $t_2$, the temperature value measured by the temperature sensor of, for example, $0°$ C. is stored in an electronic system, whereupon the heater is first of all cut out. After, a time delay for example, 30 seconds the temperature at the temperature sensor in the evaporator is once again tested by the electronic system. This temperature test at the time $t_3$ is compared with the preceding temperature at the time $t_2$. If an increase in the temperature at the time $t_3$ of, for example $0.1°$ C. with respect to the temperature $t_2$ is determined, the heater remains cut out. The heater, which was cut in continuously between $t_1$ and $t_2$, has a certain time lag in its response and also continues to heat up the evaporator for a certain time after cutting-out at the time $t_2$.

Once the temperature has been established at the time $t_3$ and compared with the previous measured value, the measured value determined at the time $t_2$ is erased from the memory and the measured value at $t_3$ is stored. After a period of time of 30 seconds, the temperature is tested once again at the temperature sensor at the time $t_4$. If the measured value is above the preceding measured value at the time $t_3$ by, for example 0.1 or more than $0.1°$ C., the heater remains cut out, whereupon the measured value at the time $t_3$ is erased and the measured value at $t_4$ is stored. This operation is repeated until it is determined in a renewed comparison that the temperature in the room to be heated has dropped, for example by $0.1°$ C., with respect to the preceding measured value. In this case, the heater is cut in again, as is indicated in the diagram at the time $t_5$.

After renewed cutting-in of the heater at the time $t_5$, the temperature in the room to be heated rises, so that a temperature which is more than 0.1° C. above the previously stored measured value at the time $t_5$ is established upon the renewed inquiry at the time $t_6$. The heater is then cut out and the temperature test is repeated in the same way at preselected intervals of time with comparison of the respectively preceding measured value. Only when the temperature once again drops for example by 0.1° C. or more is the heater cut in again.

This procedure of temperature testing and compairson with the preceding measured value is continued until the cut-out-temperature of the defrost heater of, for example, 10° C. is reached in the room to be heated. Thereafter, the defrost heater remains cut out until a signal for defrosting is again emitted by the ice detector and the defrost heater is cut in. Hereupon, the procedure described of controlling the defrost heater by cutting in and cutting out as a function of a temperature drop or rise is repeated at predetermined intervals of time. In this way, the residual heat of the defrost heater is utilised in stages and heating energy is only supplied in stages for defrosting, so that, once the cut-out temperature of the heater at, for example, 10° C. has been reached, the refrigerating room is supplied virtually no more heat due to the time-lag response of the heater. In the ensuing refrigerating operation, therefore no temperature above the preselected cut-out temperature has to be reduced in the refrigerating room.

Although a longer time is required for the defrosting operation by this controlling of the defrost heater than in the case of a continuously cut-in defrost heater according to the prior art, the formation of ice pockets on the evaporator is avoided due to the longer defrosting operation, because the heat emitted by the defrost heater can spread more evenly over the evaporator region, while on the other hand the defrosting operation does not continue so long that the refrigerated goods would be damaged by it.

The temperature of 0° C. specified in the case of the exemplary embodiment described for the cutting-out of the defrost heater for the first time at the time $t_2$ represents a preselected temperature which can be set to a different temperature value, according to whether a certain room or container is to be heated up.

If a measured value of the temperature is stored and the following measured value lies within the range of ±0.1° C. around the stored value, the preceding state of the heater (cut in or cut out) may be retained, or in any case the heater cut in again.

The residual heat of a usual defrost heater in refrigerating plants is so high after a cut-in period of 30 seconds that there is no high switching frequency with the previously described testing at intervals of 30 seconds. However, lt is also possible to test the temperature in the refrigerating room every 60 seconds and to cut in again or cut out the heater at a temperature difference of ±0.2° C. with respect to the previously stored value.

The described control of a heater may be used for various application purposes, for example in a hot-water boiler which is to be heated up to a certain temperature and kept at this temperature. In particular, this control is suitable for defrost heaters in refrigerating plants, including relatively small refrigerating plants, the temperature sensor being arranged in each case in the evaporator or at the place where ice can form, which has to be thawed out.

In the case of a refrigerating plant, a pressure sensor which is arranged on the suction side of the compressor or of the refrigerating plant may also be provided instead of a temperature sensor which is arranged in the evaporator and emits an electric signal according to the temperature determined. Since the pressure on the suction side of the refrigerating plant is dependent on the temperature of the evaporator, the pressure value can be used in the same way for controlling the defrost heater as the temperature value supplied by a temperature sensor. Such a pressure sensor is a temperature sensor and supplies an electric signal, which is processed in the electronic control system like the previously described temperature signal. The use of such a pressure measurement is accordingly equivalent to a temperature measurement and is intended to be covered by reference to measurement of temperature as in the appended claims.

In the case of a modified embodiment of the control process, the temperature can be tested continually at certain intervals of time already when cutting-in the defrost heater at the time $t_1$, the measured values established being stored, so that the profile of the temperature curve or its steepness is obtained. If the temperature curve is flatter in the region of 0° C., it can be recognised from this that the latent range of the transformation of ice crystals into water is involved, whereupon the testing cycle of the temperature, commencing at $t_2$, can commence automatically without a temperature value in the region of 0° C. being set beforehand for the cutting-out of the defrost heater for the first time.

According to a further modification, once the defrost heater has cut out for the first time at the time $t_2$, the steepness of the temperature profile can be established by several measured values of the temperature being stored successively. In this way it is possible to compare the steepness of successive curve sections in a certain unit of time with one another, whereupon the heater is only cut out if there is a certain high residual amount of heat of the preceding heating period, which can be recognised by a steep curve profile. In a corresponding way, the heater can be cut in again if there is a flat profile of the curve section concerned, which indicates that there is only a small amount of residual heat left.

The defrost heater itself is usually designed as an electric heater, but it is also possible to use, for example, a heated liquid medium as heater.

I claim:

1. Process for controlling a defrost heater for a refrigerator plant having a room, with a temperature sensor, which is connected to a system for cutting-in and cutting-out the heater, characterized in that, during the operation of the heater, the temperature of the room to be heated is measured at certain intervals of time, a measured temperature value being stored in each case and compared with a subsequently measured value, whereupon the heater is cut out whenever the subsequently measured value indicates a temperature which is higher by a certain amount than the preceding stored measured value, and wherein the heater is cut in or remains cut in if the subsequently measured value indicates a temperature which is lower by a certain amount than the preceding, stored, measured value.

2. Process according to claim 1, characterized in that, after cutting-in of the heater at a certain cut-in temperature, only after a predetermined temperature has been reached is the further temperature profile tested at predetermined intervals of time and the heater cut in or cut out in dependence thereon.

3. Process according to claim 1 or 2, characterized in that, in the case of a refrigerating plant having an evaporator having a suction side temperature is measured by a pressure sensor provided on the suction side of the refrigerating plant in the evaporator, in order to determine the temperature profile in the evaporator and consequently the residual heat of the defrost heater.

* * * * *